United States Patent
Gamache

(10) Patent No.: US 9,316,258 B2
(45) Date of Patent: Apr. 19, 2016

(54) NON-CONTACT SEALING SYSTEM FOR BEARINGS

(71) Applicant: Michael Gamache, Tolland, CT (US)

(72) Inventor: Michael Gamache, Tolland, CT (US)

(73) Assignee: THE CARLYLE JOHNSON MACHINE COMPANY, Bolton, CT (US)

(*) Notice: Subject to any disclaimer, the term of this patent is extended or adjusted under 35 U.S.C. 154(b) by 0 days.

(21) Appl. No.: 14/486,252

(22) Filed: Sep. 15, 2014

(65) Prior Publication Data

US 2015/0219161 A1    Aug. 6, 2015

Related U.S. Application Data

(60) Provisional application No. 61/935,026, filed on Feb. 3, 2014.

(51) Int. Cl.

| | |
|---|---|
| F16C 33/72 | (2006.01) |
| F16C 33/66 | (2006.01) |
| F16J 15/42 | (2006.01) |
| F16C 33/76 | (2006.01) |
| F16C 35/04 | (2006.01) |
| F16J 15/40 | (2006.01) |
| F16C 19/54 | (2006.01) |

(52) U.S. Cl.
CPC ........... *F16C 33/766* (2013.01); *F16C 33/6666* (2013.01); *F16C 33/72* (2013.01); *F16C 35/042* (2013.01); *F16J 15/406* (2013.01); *F16J 15/42* (2013.01); *F16C 19/543* (2013.01); *F16C 33/723* (2013.01)

(58) Field of Classification Search
CPC ....... F16J 15/16; F16J 15/447; F16J 15/4476; F16J 15/4478; F16J 15/54; F16J 15/42; F16J 15/406; F16C 33/6629; F16C 33/6666; F16C 33/6681; F16C 33/6685; F16C 33/766; F16C 33/72; F16C 33/723; F16C 35/042; F16C 19/543
See application file for complete search history.

(56) References Cited

U.S. PATENT DOCUMENTS

| | | | | |
|---|---|---|---|---|
| 2,779,640 | A | * | 1/1957 | Jones, Jr. ..................... 384/480 |
| 3,124,502 | A | | 3/1964 | Radke |
| 4,383,720 | A | * | 5/1983 | Ernst ............................ 384/478 |
| 4,575,306 | A | | 3/1986 | Monnot |
| 5,571,268 | A | | 11/1996 | Azibert |
| 5,662,340 | A | | 9/1997 | Bessette et al. |
| 6,170,832 | B1 | | 1/2001 | Ernst |
| 2002/0101038 | A1 | | 8/2002 | Budrow et al. |

FOREIGN PATENT DOCUMENTS

| | | |
|---|---|---|
| DE | 102004053079 B3 * | 8/2006 |
| FR | 2229885 A1 * | 12/1974 |

OTHER PUBLICATIONS

Machine Translation of DE 102004053079 Dated Aug. 3, 2006.*

* cited by examiner

*Primary Examiner* — Alan B Waits
(74) *Attorney, Agent, or Firm* — McCormick Paulding & Huber LLP

(57) ABSTRACT

A non-contact sealing system for shaft bearings lubricated with lubricating fluid employs a centrifugal pressurizing seal having a stator ring and a rotor ring with a centrifugal pressure chamber to pressurize the fluid and deliver the fluid to remote portions of a bearing through channels in the bearing housing. The system enables bearings to be lubricated at stations remote from the system as well as bearings supporting shafts oriented in the vertical direction.

13 Claims, 5 Drawing Sheets

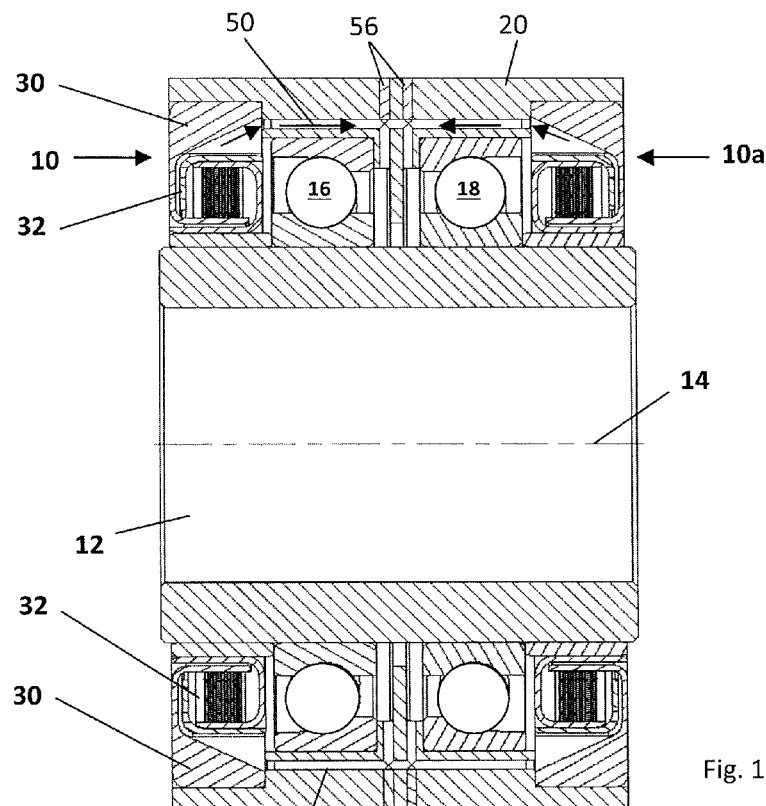
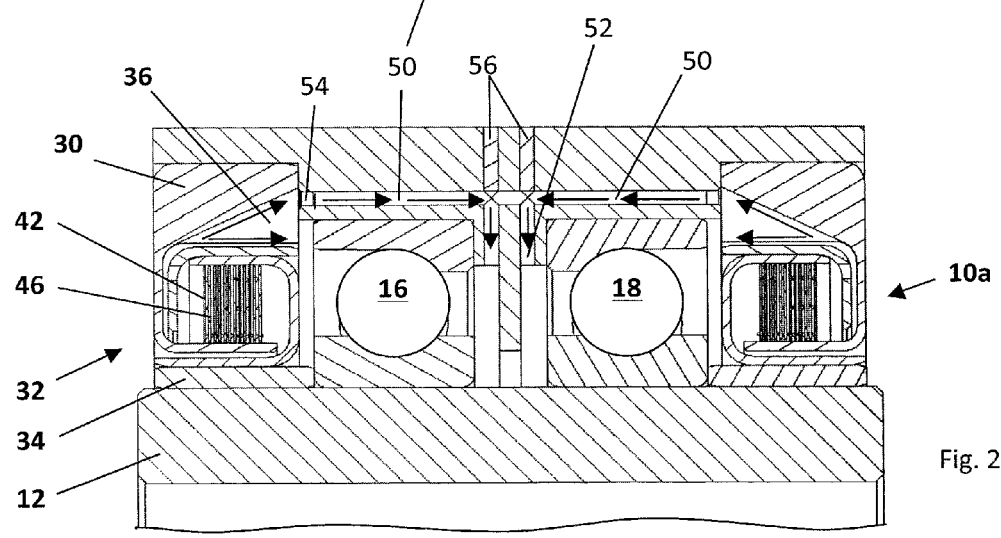

NON-CONTACT SEALING SYSTEM FOR BEARINGS

CROSS REFERENCE TO RELATED APPLICATIONS

The present application claims priority from Provisional Application 61/935,026 filed Feb. 3, 2014 and incorporates the disclosure of the provisional application herein by reference.

FIELD OF THE INVENTION

The present invention relates to a system for sealing bearings against the loss of a lubricating fluid and admission of contamination using a non-contact seal. A non-contact seal for a bearing is a seal preventing the loss of lubricating fluid from a bearing, or the admission of contaminants, and having low resistance to rotation because sealing surfaces moveable rotationally relative to one another are not in frictional contact.

BACKGROUND OF THE INVENTION

Non-contact seals are known in the art and generally fall into categories of labyrinth, hybrid labyrinth, and centrifugal pressure seals. Such seals are used to keep lubricating fluids in a rotatable shaft bearing, and may also keep foreign contaminants out of the bearing.

An example of a centrifugal pressure seal for roller or ball bearings having a lubricating fluid is found in U.S. Pat. No. 6,170,832 to Ernst. In such a seal a centrifugal pumping chamber pressurizes a portion of the lubricating fluid when the bearing is rotated, and feeds the pressurized lubricating fluid to the bearing to fill the bearing with lubricant or replenish lubricant that was lost.

A number of environments that until now could use the advantages of a non-contact seal have not been able to take advantage of the centrifugal pressure seals for various reasons. For example, the seal shown in the Ernst patent is situated immediately adjacent the bearing being serviced by the non-contact seal. Greater flexibility in use of the centrifugal pressure seal would be enjoyed if the seal did not have to be directly adjacent the bearing. The centrifugal seal could also enjoy wider use if the seal could service multiple bearings from a location remote from the bearing. Also the centrifugal seal until now has not been available for use with vertically oriented shafts because of the problem of the lubricating fluid draining from the seal. Solutions to these and other problems are provided by the present invention.

SUMMARY OF THE INVENTION

The present invention relates to a non-contact sealing system for shaft bearings lubricated with a lubricating fluid by a centrifugal pressure seal. The system includes a bearing housing that supports a shaft in the bearing to be sealed for rotation about the axis of the shaft. A stator ring is mounted in the bearing housing, and has an annular channel circumscribing the ring and the shaft supported by the housing.

A rotor ring is mounted on the shaft supported by the bearing in the bearing housing adjacent the stator ring. The rotor ring is rotatable with the shaft and has an annular centrifugal pressurizing chamber circumscribing the rotor ring for pressurizing lubricating fluid in the chamber when the rotor ring is rotated with the shaft. The annular centrifugal pressurizing chamber of the rotor ring is positioned in the annular channel of the stator ring and has at least one discharge port at the outer periphery of the chamber for discharging pressurized lubricating fluid into the annular channel of the stator ring. The pressurization arises due to centrifugal force when the chamber and the rotor ring spin with the shaft and the lubricating fluid in the chamber is thrust radially outward. So-called pumping rings or discs may be placed in the chamber to stop splashing of the lubricant and maintain laminar flow between the rings as the fluid is spun in the chamber.

The bearing housing has fluid conduits communicating with the annular channel of the stator ring to pick up the lubricating fluid pressurized in the centrifugal pressurizing chamber and discharged into the annular channel of the stator ring. The conduits then carry the pressurized lubricating fluid to a bearing supported remotely in the bearing housing.

The invention as described enables the sealing system adjacent a bearing to deliver the pressurized lubricant to the side of the bearing opposite from the stator and rotor rings, or to several remote bearings that share the same lubricating fluid.

The invention also allows the sealing system to be employed with shafts that are vertically oriented by delivering the pressurized lubricating fluid to upper bearings and allowing the pumped fluid to drain by gravity back down through bearing or bearings to the pressurizing chamber. In such an installation, the pressurizing chamber may be enlarged to define a reservoir for extra lubricating fluid that is needed to circulate through the larger system. The system is also self-sealing by virtue of the reservoir at the bottom.

The advantages enumerated above and other advantages will be appreciated by those skilled in the art from the following description of the invention.

BRIEF DESCRIPTION OF THE DRAWINGS

FIG. 1 is a cross-sectional view of a horizontal shaft supported by two bearings, each of which employs the non-contact sealing system of the present invention.

FIG. 2 is an enlarged fragmentary cross-sectional view illustrating the upper portion of FIG. 1 in greater detail.

DESCRIPTION OF THE PREFERRED EMBODIMENTS

Figures 3A, 3B:
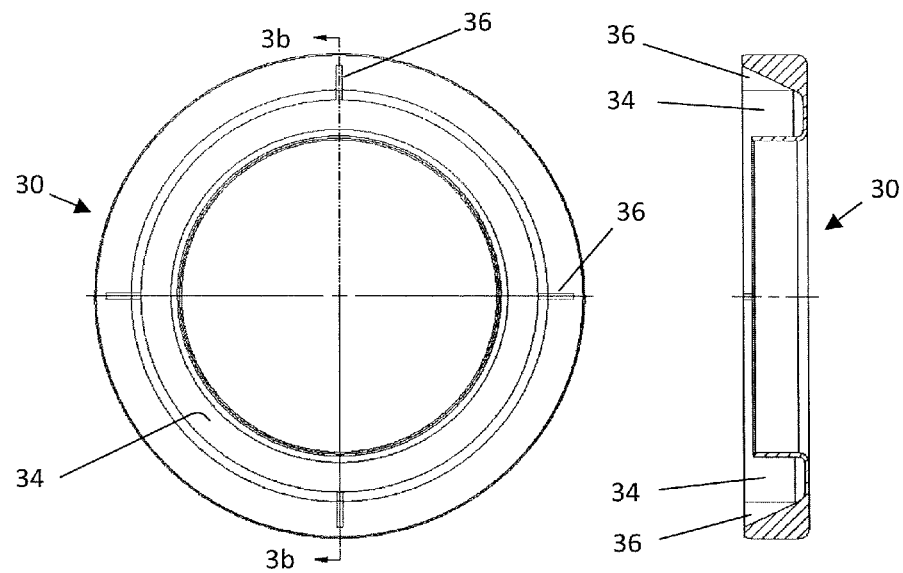
FIGS. 3a-3d illustrate one embodiment of the stator ring of the present invention.
Figures 3C, 3D:
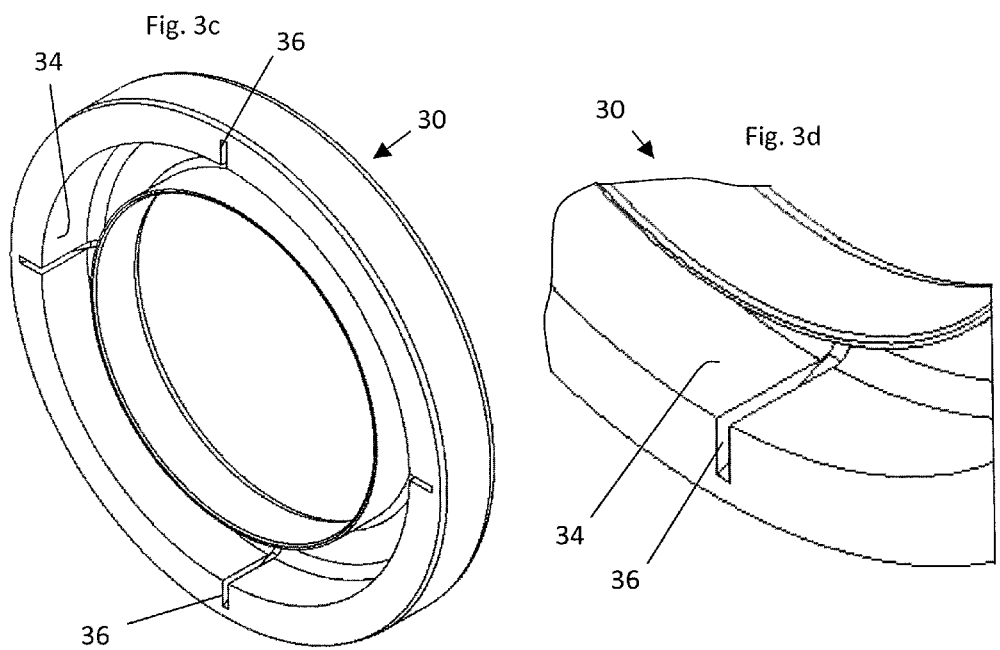

FIGS. 1 and 2 illustrate one embodiment of the non-contact sealing system 10 used in connection with a shaft 12 supported for rotation about a horizontal shaft axis 14 by means of two ball bearings 16 and 18 in a bearing housing 20.

For purposes of illustration, the lengths of the shaft 12 and the bearing housing 20 have been shortened, and as a consequence the bearings 16 and 18 are axially positioned almost adjacent one another. The length of the shaft 12, the bearing housing 20 and axial spacing of the bearings can be much greater, and the sealing system 10 would function in the same manner as described hereafter. In this regard the term "bearing housing" is to be interpreted to include a structure composed of multiple parts that are joined together to support a bearing and a shaft for rotation about a shaft axis.

The ball bearing 16 contains a limited quantity of lubricating fluid or bearing oil in the cavities in and around the balls and bearing races for lubrication of the bearing. The non-contact sealing system 10 has a centrifugal pressurizing seal that is positioned adjacent the bearing 16 and serves the function of supplying and replenishing the lubricating fluid in the bearing as well as pumping and circulating the limited quantity of fluid through the bearings 16 and 18 when the shaft 12 and bearing are rotating. The sealing system may also include a non-contact sealing system that excludes contaminants from entering the bearings as shown in U.S. Pat. No. 6,170,832 to Ernst. The non-contact sealing system 10a adjacent the bearing 18 is a mirror image of the system 10, has the same basic structure as the system 10, and serves the same fluid pumping and replenishment functions for the bearings. Hence, only the structure and operation of the sealing system 10 with the bearings are described below.

FIGS. 1 and 2 show the non-contact sealing system 10 with a centrifugal pressurizing seal comprised by a stator ring 30 and a rotor ring 32. The stator ring 30 and the rotor ring 32 are positioned between the shaft 12 and the bearing housing 20 adjacent the outer side of the roller bearing 16. If desired, a bushing 34 may be positioned on the shaft for a firm press fit between the rotor ring to the shaft and to insure that the rotor ring rotates with the shaft relative to the stator ring 30 and bearing housing 12. The stator ring similarly has a press fit in the housing to insure that the stator ring remains stationary in the bearing housing. The stator ring and the rotor ring may be formed from stamped sheet metal fabrications which facilitate the press fit to the shaft and housing respectively.

As shown most clearly in FIGS. 3a-3d, the stator ring 30 is formed with an annular channel 34 that circumscribes the ring on one axially end face of the ring. When mounted next to a bearing, such as bearing 16, the annular channel faces the bearing in the axial direction. A series of radially extending notches 36 reaching into the annular channel 34 are spaced circumaxially about the ring in the outer portion of the ring 30 and serve to deliver pressurized lubricating fluid from the non-contact seal to the bearings 16 and 18 as explained hereafter.

Figure 4:
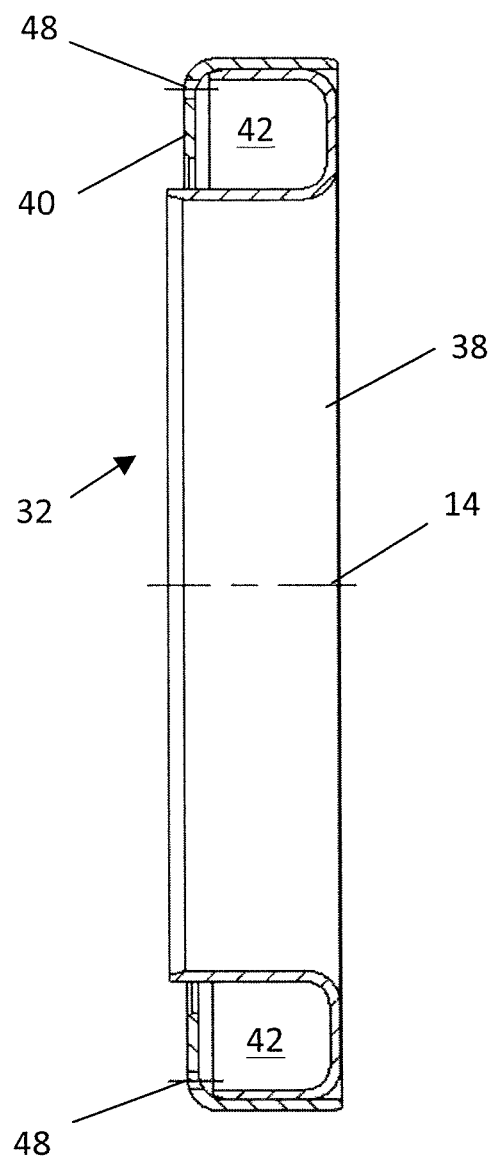
FIG. 4 is a cross-sectional view of a rotor ring that cooperates with the stator ring of FIGS. 3a-3d.

The rotor ring 32, illustrated in isolation in FIG. 4, is comprised of two stamped sheet metal annular parts 38 and 40. The annular parts are pressed fit together as shown and form an annular centrifugal pumping chamber 42 that circumscribes the shaft axis 14. When the rotor ring 32 is assembled with the stator ring 30 as shown in FIGS. 1 and 2, the pumping chamber 42 of the rotor ring is positioned in the annular channel 34 of the stator ring, and is in fluid communication with the bearings 16 and 18 through the annular channel 34 and the notches 36 of the stator ring 30.

FIG. 2 shows a series of annular pumping discs 46 positioned in the pumping chamber 42 and circumscribing the shaft axis 14. The discs are free floating in the chamber and have dimples to maintain spacing between the discs. When the rotor ring 32 is rotated with a shaft 12, lubricating fluid in the pumping chamber is centrifugally thrown radially outward toward the outer wall of the pumping chamber. In the process the discs serve the purpose of maintaining an orderly laminar flow of the lubricating fluid outwardly to develop a higher fluid pressure at the outer wall of the pumping chamber 42. It is this pressure which is used to deliver the lubricating fluid to the bearings 16 and 18.

A series of discharge apertures 48 shown in FIGS. 2 and 4 are circumaxially spaced about the part 40 of the rotor ring 32 at the outer periphery of the centrifugal pumping chamber 42 to allow the lubricating fluid pressurized in the chamber to be discharged into the annular channel 34 and notches 36 of the stator ring as shown by the arrows. From the notches, the pressurized lubricating fluid is ducted directly to the nearside of the bearing 16 and indirectly to the remote side of the bearing through channels 50, 52 in the bearing housing 20. The channels 50, 52, which form part of the sealing system, are distributed circumaxially in the bearing housing and are in fluid communication with the notches 36 by way of an annular groove 54 in the end of the housing. Of course the pressurized lubricating fluid can be ducted from the pressurizing chamber 42 to the bearing 16 by other channel designs in the bearing housing.

It should be noted that the pressurized lubricating fluid from the pressure chamber 42 can be delivered by the channels 50 to the bearing 18 that is remote from the chamber, and pressurized lubricating fluid from the pressurizing chamber adjacent to the remote bearing 18 can be delivered to the bearing 16. Hence the lubricating fluids for each bearing can be shared.

It will be understood that the stator ring 30 and the rotor ring 32 preferably should maintain a fluid-tight relationship with the bearing housing 20 and the shaft 12 in order to prevent the lubricating fluid 22 from leaking out of the sealing system. Fill ports 56 are provided at the upper portion of the housing for filling and replenishing lubricating fluid in the system. However, when the shaft and rotor ring 32 are not rotating, the lubricating fluid will drain into the lower portion of the pressure chamber 42 and bearing housing 20. When shaft rotation is resumed, the lubricating fluid will again be pumped from the centrifugal pumping chamber 42 back into the bearings through the notches 36 in the stator ring 30 and the channels 50, 52 in the bearing housing 20.

Figure 5:
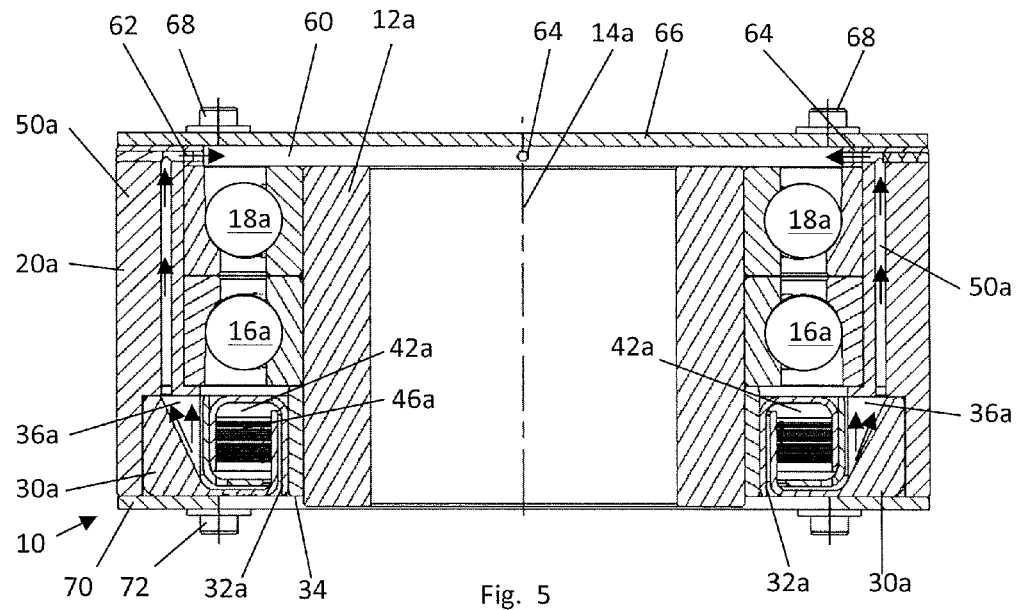
FIG. 5 is a cross-sectional view of a vertically oriented shaft supported by two bearings and employing the non-contact sealing system of the present invention.
Figure 6:
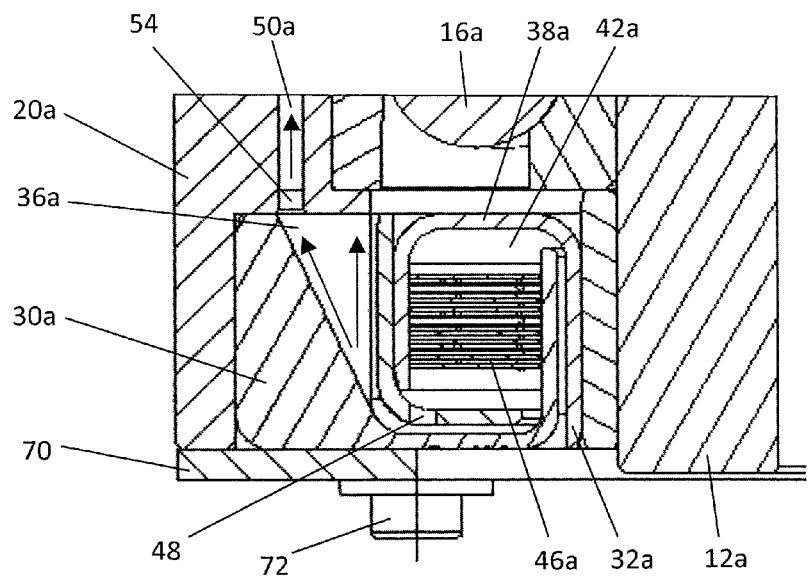
FIG. 6 is a fragmentary cross-sectional view illustrating the lower, left portion of FIG. 5 in greater detail.

FIGS. 5 and 6 illustrate an embodiment of the non-contact sealing system employed with a vertically oriented shaft 12a supported by roller bearings 16a and 18a in a housing 20a. In the embodiment of FIGS. 5 and 6, parts corresponding to the parts in the embodiment of FIGS. 1-4 bear the same reference numerals, and parts performing similar functions but with different or modified structure have the same reference numerals with a subscript "a" added.

For purposes of illustration, the length of the shaft 12a and the housing 20a have been reduced in FIG. 5, and the roller bearings 16a and 18a are positioned adjacent one another rather than spaced from one another as would be the case with a longer shaft and housing. The principles of operation of the non-contact sealing system as described hereafter are the same regardless of the dimensional reductions.

The non-contact sealing system in FIGS. 5 and 6 for the vertically oriented shaft 12a includes a single centrifugal pressurizing seal formed by a stator ring 30a and a rotor ring 32a and held in the bearing housing 20a by a retaining ring 70 and bolts 72. The rings 30a and 32a have substantially the same structure as the rings 30 and 32 of the embodiment in FIGS. 1-4 and function in the same fashion, except the dimensions of the rings 30a and 32a in the vertical direction identified by the shaft axis 14a are larger to form a larger reservoir and pressurizing chamber 42a for the lubricating fluid when the shaft 12a is not rotating. Specifically, the dimensions of the pressurizing chamber 42a and the annular channel 34a in the stator ring in the axial direction are large enough to accommodate a volume of lubricating fluid that is needed to reach the remote sides of the bearings 16a and 18a.

The number of pumping discs 46a may also be increased to maintain laminar flow in the pressurizing chamber 42a during shaft rotation. In any event the pumping discs are located in the lower part of the pressurizing chamber to be certain that the discs are immersed in the lubricating fluid and aid in the pressurizing function.

The bearing housing 20a supports the shaft 12a with a vertical orientation for rotation in the bearings 16a and 18a. The non-contact sealing system includes the stator ring 30a and rotor ring 32a positioned in the housing at the lower end of the shaft 12a. The system supplies pressurized lubricating fluid from the pressurization chamber 42a through the series of discharge ports 48 in the rotor ring 32a and the notches 36a in the stator ring 30a to multiple vertically extending, circumaxially spaced channels 50a in the housing 20a, as indicated by the arrows.

Figure 7:
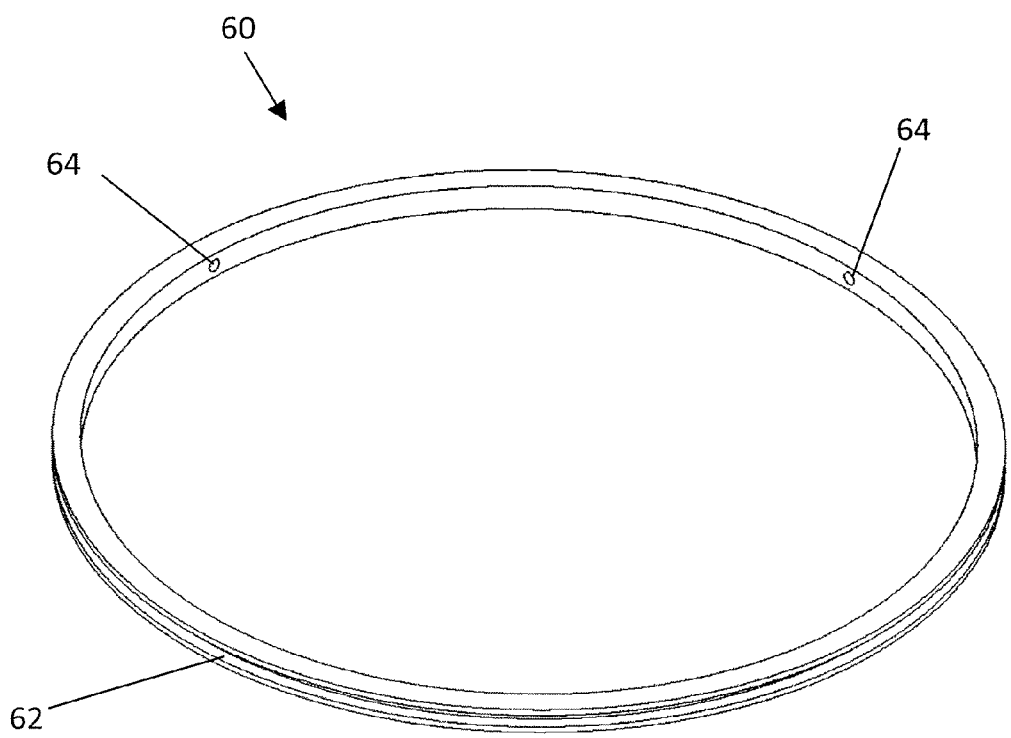
FIG. 7 is a perspective view of a fluid distribution ring employed in the embodiment of FIG. 5.

At the upper side of the housing 20a, a fluid distribution ring 60 shown in isolation in FIG. 7 captures the lubricating fluid, and directs the lubricating fluid onto the top of the bearing 18a. The fluid then drains down through the bearings 18a and 16a and returns to the pumping chamber 42a where the fluid can be re-pressurized and re-circulated through the bearings.

The fluid distribution ring 60 shown in FIGS. 5 and 7 performs several functions. As shown in FIG. 5, the ring is annular and is press fit into the upper end of the bearing housing 20a to produce a fluid tight relationship with the housing. The ring 60 has an annular outside groove 62 which registers with the channels 50a of the bearing housing and in this manner receives the pressurized lubricating fluid from pumping chamber 42a. The annular groove 62 in the ring extends around the outer side of the ring and has multiple discharge ports 64, for example, four equally spaced holes, in the base of the groove to distribute and discharge the lubricating fluid over the bearings.

In addition to being pressfit into the upper end of the bearing housing 20a, the discharge ring 60 is clamped against the outer race of the bearing 18a by means of a coverplate 66 and clamping bolts 68 extending into the housing. Thus the discharge ring retains the bearing 18a in the bearing housing. If necessary a sealing compound may be added between the coverplate and the housing.

In operation, the rotation of the shaft 12a and the rotor ring 32a on the shaft causes the lubricating fluid to be pressurized by centrifugal force in the pressure chamber 42a and discharged into the lower bearing 16a directly and into the upper bearing 18a through the channels 50a and distribution ring 60. The lubricating fluid drains down through the bearings by gravity, and can again be circulated through the bearings. When shaft rotation stops, all the lubricating fluid returns to the reservoir formed by the pressurization chamber and annular channel 34a within the stator ring 30a, and forms a seal to keep contaminants out of the sealing system.

While the present invention has been described in several embodiments, it will be understood that other variations and modifications can be made without departing from the spirit of the invention. For example, although the bearing housings have been illustrated as one piece, the housing can be formed as multi-piece structures with continuous channels leading between the pieces. The rotor ring has been described as being formed by stamped sheet metal parts, but can be formed by other methods. Accordingly, the non-contact sealing system has been described by way of illustration rather than limitation.

The invention claimed is:

1. A non-contact sealing system for a shaft bearing lubricated with a lubricating fluid comprising:
  a bearing housing for the shaft bearing for supporting a shaft for rotation about an axis;
  a stator ring for mounting in the bearing housing, the stator ring having an annular channel circumscribing the stator ring;
  a rotor ring for mounting on the shaft supported by the bearing in the bearing housing, the rotor ring being rotatable with the shaft and having an annular centrifugal pressurizing chamber circumscribing the rotor ring for pressurizing lubricating fluid in the chamber when the rotor ring is rotated with the shaft, the annular centrifugal pressurizing chamber being positioned in the annular channel of the stator ring and having a discharge port at the outer periphery of the chamber for discharging pressurized lubricating fluid into the annular channel of the stator ring; and
  the bearing housing having fluid conduits communicating with the annular channel of the stator ring for carrying lubricating fluid pressurized in the centrifugal pressurizing chamber of the rotor ring to the shaft bearing supported in the bearing housing,
  the annular channel of the stator ring having a series of circumaxially spaced openings in the outer periphery of the annular channel, and the fluid conduits in the bearing housing communicate with the openings in the outer periphery of the annular channel to conduct pressurized lubricating fluid from the pressurizing chamber to the shaft bearing.

2. A non-contact sealing system for a shaft bearing as defined in claim 1 wherein a plurality of pumping rings are positioned in the centrifugal pressurizing chamber of the rotor ring to aid the pressurization of the lubricating fluid in the chamber.

3. A non-contact sealing system for a shaft bearing as defined in claim 1 wherein the fluid conduits in the bearing housing communicate with the shaft bearing at the axial side of the bearing remote from the rotor ring and stator ring.

4. A non-contact sealing system for a shaft bearing as defined in claim 1 wherein the fluid conduits in the bearing housing communicate with a plurality of chambers for the shaft bearing in the bearing housing.

5. A non-contact sealing system for a shaft bearing as defined in claim 1 wherein:
  the bearing housing is designed to support the shaft with a vertical orientation;
  the stator ring and rotor ring with the centrifugal pressurizing chamber are positioned in a lower part of the bearing housing below the shaft bearing with a vertical orientation to seal lubricating fluid in the shaft bearing; and
  the fluid conduits in the bearing housing lead from the annular channel in the stator ring below the bearing supporting the shaft with a vertical orientation to a position above the shaft bearing.

6. A non-contact sealing system for a shaft bearing as defined in claim 5 wherein the annular channel of the stator ring and the centrifugal pressurizing chamber of the rotor ring cooperate to form a lubricating fluid reservoir to contain the lubricating fluid drained from the fluid conduits in the bearing housing and the shaft bearing in the non-rotating condition.

7. A non-contact sealing system for a shaft bearing as defined in claim 1 wherein the bearing housing further includes a fill port connecting with the fluid conduits in the housing for introducing lubricating fluid into the non-contact sealing system.

8. A non-contact sealing system for sealing a bearing supplied with a lubricating fluid comprising:
  a stator ring for mounting on a shaft coaxially adjacent the bearing to receive lubricating fluid, and defining an annular channel on one side of the ring;

a rotor ring for mounting on a shaft coaxially adjacent the bearing, and defining an annular pressure chamber positioned substantially in the annular channel at the one side of the stator ring for rotation in the channel, the rotating pressure chamber pressurizing a lubricating fluid for the bearing by virtue of centrifugal force when the rotor ring and chamber are rotated on the shaft adjacent the bearing, the chamber having ports for discharging pressurized lubricating fluid into the annular chamber of the stator ring; and a bearing housing for supporting the bearing, the rotor ring, and the stator ring when mounted on a shaft with the bearing; and the stator ring and the bearing housing include lubricating fluid channels leading from the annular channel in the stator through the bearing housing to a remote location opposite from the side of the bearing where the stator and rotor rings are located; and the annular chamber in the stator ring has a series of circumaxially spaced openings in an outer periphery thereof in communication with the lubricating fluid channels leading to the remote location.

9. A non-contact sealing system for a bearing supplied with a lubricating fluid as defined in claim 8 wherein the remote location is located between the bearing and another bearing mounted on the shaft, whereby pressurized lubricating fluid from the pressure chamber can be fed to the two bearings.

10. A non-contact sealing system for a bearing supplied with a lubricating fluid as defined in claim 8 wherein the shaft supported by the bearing is a vertically oriented shaft; the stator and rotor rings are located on the shaft below the bearing, and the remote location is above the bearing, whereby the lubricating fluid is delivered from the pressure chamber to a position above the bearing and can drain down through the bearing.

11. A non-contact sealing system for a bearing supplied with a lubricating fluid as defined in claim 10 wherein the annular channel in the stator ring defines a reservoir that captures the lubricating fluid draining downward through the bearing.

12. A non-contact sealing system for a bearing supplied with a lubricating fluid as defined in claim 10 further including a fluid distribution ring at the remote location in fluid communication with the channels in the bearing housing.

13. A non-contact sealing system for a bearing supplied with a lubricating fluid as defined in claim 12 wherein the fluid distribution ring is a non-rotating ring having discharge ports discharging the lubricating fluid onto the bearing.

\* \* \* \* \*